United States Patent Office 3,454,529
Patented July 8, 1969

3,454,529
PROCESS FOR THE MANUFACTURE OF BENZO-GUANAMINE - MELAMINE - FORMALDEHYDE FILLED MOLDING COMPOSITIONS
George Sims Casebolt, New Haven, Conn., assignor to American Cyanamid Company, Stamford, Conn., a corporation of Maine
No Drawing. Continuation-in-part of application Ser. No. 434,689, Feb. 23, 1965. This application Apr. 20, 1966, Ser. No. 543,808
Int. Cl. C08g 9/26, 9/30, 51/74
U.S. Cl. 260—67.6                                         5 Claims

ABSTRACT OF THE DISCLOSURE

A process for the manufacture of a benzoguanamine-melamine-formaldehyde resin and its conversion to filled molding compositions containing as a catalytic agent certain quantities of magnesium bromide.

---

The present application is a continuation-in-part of application Ser. No. 434,689, filed Feb. 23, 1965, entitled "Improved Process for the Manufacture of Benzoguanamine-Melamine-Formaldehyde Filled Molding Composition," now abandoned.

The present invention relates to a new and improved process for the manufacture of a benzoguanamine-melamine-formaldehyde filled molding composition and to certain new and unexpectedly beneficial catalyst compositions employed in the operation of such process as well as the fast curing, yet storage stable molding compositions produced from such process.

The primary object of the present invention is to provide an improvement in the manufacture of benzoguanamine-melamine-formaldehyde filled molding compositions which involves the discovery and application of certain unique process techniques and further involves the use of a potent new catalyst conversion system. The net result of my discovery is to enable manufacturers of such molding compositions to present to the molding industry a molding composition uniform in physical and chemical composition, stable in storage, light, friable and fluffy in appearance, and capable of being easily dried as a porous uniform bed of product on a screen type drier. This in addition to the controllable cure time of my product is of great value to the molder of such compositions.

By comparison, the present product of the prior art when existing as a syrup before being impregnated on the filler is an uncontrollable heterogenous mixture of monomers and polymers of various sizes and composition. Moreover, after being admixed with a filler it resembles a pasty glob of non-porous material which is not uniform either in size or chemical consistency.

Above all the prime advantage of my invention is demonstrated in the key step to this entire operation, i.e., the formulation and handling of the monomeric resin syrup. The resin syrup of my invention is a clear hydrophilic syrup produced in about one-half the time previously reported, for example, in United States Patent No. 2,579,985 to Varela and Schupp, and others. My resin syrup is so easily handled that the reactors and equipment can be cleaned up with ordinary warm water in contrast to the syrup of the Varela process which is so viscous and hydrophobic that equipment employed must be cleaned with hot alcoholic solutions such as hot methanol bath.

A critical aspect of my new process technique involves the use of a new catalyst system which makes possible an orderly condensation reaction in my resin at a later step of curing of the monomers to the polymer. This catalyst is added to my hydrophilic syrup as a latent catalyst either in whole or in part. In operation, the novel catalyst comprises from 0.1 to 0.6% by total weight of the composition of $MgBr_2$ either alone or in accompaniment with a like amount of a catalyst promoter, phthalic anhydride. Whether the combination of the two catalysts or just one is used will depend upon the exact nature of the resin being cured and the optimum cure time desired since the virtue of this unique mode exists in that it gives a uniform controlled rate of cure which is not too fast or not too slow to form resins which exhibit desirable shelf stability on the one hand and product uniformity because of orderly and efficient conversion on the other.

With the inclusion of these latent curing agents into my hydrophilic monomeric resin solution my process permits me to have a monomeric resin solution free from any alcoholic diluents at the time I mix my resin with the filler i.e., alpha-cellulose pulp for example. This condition is important to one engaged in processing this kind of resin because it enables one to have the monomer which will readily penetrate into the pores of the filler, i.e., cellulose without inhibition of said penetration of resinous materials into the pores by the presence of alcohol-water solvent mixtures. As can be summed up, I have discovered a particular mode of preparing a benzoguanamine-melamine-formaldehyde resin by means of which I end up with an ideal resin syrup to impregnate the cellulose filler pulp.

While the principal object of my invention is to disclose and claim the improved method of manufacture of molding compositions noted above, it is also an object to disclose and claim the novel hydrophilic syrup comprising the monomeric reaction product of benzoguanamine, melamine and formaldehyde along with less than 1% of the latent catalyst composition noted above.

It is well known that when benzoguanamine is added to a melamine-formaldehyde resin in the manufacture of molding compositions that the ultimate molded product obtained displays a dramatic improvement in coffee stain resistance. By way of background of the present invention, it should be noted that Varela and Schupp in United States Patent No. 2,579,985 the disclosure of which is incorporated herein by reference describe a process for preparing a benzoguanamine-melamine-formaldehyde cellulose filled molding composition. This patent clearly describes that when the benzoguanamine, melamine and formaldehyde are jointly employed in the preparation of a resinous material, the molded article formed therefrom has remarkable coffee stain resistance far superior to that of ordinary melamine formaldehyde formed articles, i.e., dinnercups and the like. Nevertheless, in processing the resin a number of difficulties have arisen because of the problem of compatibility of the two aminotriazine formaldehyde resins in manufacture and getting sufficient benzoguanamine resin into the final blend to achieve and sustain coffee stain resistance. The present discovery has led to an invention which it is believed has overcome all of these difficulties.

Accordingly, my invention comprises first reacting the benzoguanamine component with sufficient formaldehyde to form monomeric methylol benzoguanamine. The pH of the reaction, which is critical, is maintained in the basic range of about pH 9.0 or slightly above. The reaction time at reflux is only about 5 minutes or so at this level of pH. The methylol benzoguanamine being in the monomeric state is completely soluble in the aqueous solvent at this point. The melamine reactant is then at this point added and reacts essentially mole for mole with the balance of the formaldehyde in the solution. The resulting reaction product has added to it one of the latent catalysts enumerated above and in its finished form it is a clear hydrophilic syrup capable of being easily impregnated into a porous filler, stable during storage and quite readily curable to a molded object under proper cure conditions.

In preparing the aforesaid melamine-benzoguanamine-formaldehyde resin syrup as described above one reacts melamine, benzoguanamine and formaldehyde in certain mole ratios of the melamine to benzoguanamine and also the mole ratio of the total amount of aminotriazines to formaldehyde must be controlled. The co-reacted resin should have present melamine and benzoguanamine in a mole ratio within the range of 1:2 to 3:1 respectively and preferably 1:1.5 respectively. As regards the ratio of total triazines, i.e., benzoguanamine and melamine to formaldehyde, this should be within the range of 1:1.5 to 1:2.1 respectively and preferably 1:1.8 respectively.

By way of comparison of my improved process with that of the Varela process of United States Patent No. 2,579,985 referred to above at this point let us stop and retrace the steps of Varela. In his method after all the reactants are added and the reaction mixture is obtained as a hydrophobe the entire batch is solubilized in an alcohol water mixture, and the solids content in the batch reduced to about 50%. However, the resin syrup at this point is so viscous and hydrophobic that the equipment must be cleaned up after each operation with a hot alcoholic solution. Just based on this practical difficulty it can readily be seen that the Varela process has a deficiency which could render it impractical when scaled up to commercial operation.

In contrast, the present process not only permits the inclusion of a large part of benzoguanamine but also makes the process workable from a practical standpoint because the materials are simple, water soluble, hydrophilic monomers. These drawbacks of the prior art have been met and overcome by the steps of (1) allowing first the benzoguanamine and formaldehyde to react at a pH of about 9.0 and (2) later adding the monomeric reaction product of this step to the melamine reactant to obtain an end product in which the component materials are not only readily compatible, but which exhibits excellent chemical and physical properties of durability and stain resistance and ease of handling as noted above.

As a key feature of my inventive process, I have added to the syrup a small amount of a latent catalyst specifically, magnesium bromide in amounts ranging from 0.1 to about 0.6 percent of the total syrup. This added catalyst which is a curing catalyst will eventually promote a gentle and orderly condensation reaction of the monomers in the syrup, at a later step upon heating of the impregnated α-cellulose material to remove water. It will be noted that in contrast to the Varela et al. process earlier referred to, these essential steps permit me to have an alcohol-free monomeric solution at the time I mix the syrup with the α-cellulose pulp.

This condition at this point in my process is particularly important because it enables me to have in the syrup a uniform hydrophilic monomer solution which will readily penetrate into the pores of the cellulose. Therefore, by preparing and processing the benzoguanamine-melamine-formaldehyde material in the manner above specified, I end up with the ideal resin syrup to impregnate the filler and subsequently, to uniformly condense the impregnated monomer therein by heating with removal of water to obtain a friable uniform molding powder.

The amount of filler e.g., preferably alpha-cellulose pulp or a mineral filler which is blended with the melamine-benzoguanamine-formaldehyde syrup to produce the popcorn may be varied between about 25% and 42% by weight, based on the total weight of filler in the popcorn and preferably about 35% by weight of filler. The amount of filler in the final molding composition may also be varied over a wide range extending between about 18 to 32% by weight based on the total weight of final molding composition. This range is preferably about 26–29% by weight as above.

The impregnated filler is then dried in a continuous type oven by contact with hot air passing through the oven while the material passes through the oven on an endless belt. This dries the impregnated filler to a volatile content of always less than 10% to form a coarse granular mass referred to in the trade as "popcorn." To this popcorn is added various inhibitors, catalysts, mold lubricants, pigments and the like and additional benzoguanamine is added if desired.

The entire composition at this point is then ground, milled and blended in a single operation in order to comminute the popcorn to a fine particle size, i.e., about 30 microns and at the same time to blend in the added ingredients.

In the present day practice of preparing high-grade decorative molding compositions, a ball-milling process for milling the "popcorn" and blending the pigment therewith is customarily observed. A ball-mill is a rotatable drum-like piece of equipment which carries a charge of flint or porcelain balls of the same or varying diameters. The mill is ordinarly filled to a depth of about ½–⅔ of its diameter with these grinding balls. The material to be comminuted fills the interstices between the balls and part of the free space above. As the mill rotates, all of the balls are set in motion and a substantial portion of the molding composition and balls rise along the wall of the drum to the top and cascades over the remaining portion. It is this type of action that uniquely permits the ball-mill process to mill and blend concomitantly in a single operation.

Material which has been properly blended leaves the ball-mill in a form of a very fluffy powder possessing a bulk density in the order of 0.25 grams/cc. or less. This form of the composition is unsuitable for use directly as a molding material for several reasons. First, because of its exceedingly bulky characteristics inordinately large and expensive molds would be required. Secondly, besides difficulties involved in handling a powder of this type, high dust losses are experienced which poses health problems and economical disadvantages. Accordingly, the art recognizes the requirement for densifying the ground, milled and blended material.

These are various ways practiced by the prior art for suitably increasing the bulk density of the product leaving the ball-mill. These include the use of such devices as the Banbury mixer, preform machines, and the like. A recent development in the art of densification, and one to which this instant invention is particularly directed, involves the use of pressure rolls to densify the product of the ball-mill. Briefly stated, densification by the pressure roll method involves feeding the ground, milled and blended powder through a set of juxtaposed pressure rollers to yield a compacted form of the powder. Regardless of the type of densification employed, the bulk density of the composition is to be increased to at least about 1.0 gram/cc. and preferably above 1.2 grams/cc.

After proper densification of the composition as stated, the material is then granulated. Granulation is essentially a practical requirement in that it facilitates the handling of the composition by the molder. Nevertheless, the extent of granulation is not completely arbitrary as it is known to those skilled in this art that the granular is required to have a minimum degree of density usually expressed as apparent density. Generally granulated compositions designed for decorative applications should possess an apparent density of at least about 0.6 grams/cc. The concept of apparent density is a byword in the art; nevertheless, details concerning same may be found in ASTM D–1182–54.

During the drying step and prior to the addition of the benzoguanamine crystal, the impregnated filler is dried to a volatile content of less than about 10%. The mol ratio of the melamine and benzoguanamine to formaldehyde may be varied between the values earlier indicated.

The types of fillers which may be used in making such molding compositions are well-known in the art and include, in addition to the alpha cellulose referred to hereinabove, such other fillers as wood flour, mineral fibers, asbestos fibers, glass fibers, chopped rag, walnut shell flour, and the like, among others.

In order that the concept of the present invention may be more completely understood, the following example is set forth in which all parts are parts by weight unless otherwise indicated. This example is set forth primarily for the purpose of illustration and any specific enumeration of detail contained therein should not be interpreted as a limitation on the case except as is indicated in the appended claims.

EXAMPLE

Charge 2,463 parts of aqueous 44% formaldehyde, 315 parts of water, 1.65 parts of triethylamine to give a pH of 9.0, and 2,274 parts of benzoguanamine to a suitable reaction condenser. Heat to 200° F. and hold for about 5 minutes.

The ratio of the benzoguanamine reactant to the formaldehyde in the monomeric methylolbenzoguanamine reaction product is about 2 parts by total weight of the former, to 1 part by total weight of the latter.

The mol ratios of these reactants which correspond to this type weight ratio will range broadly between 0.9 to 1.0 moles of benzoguanamine to between 2.6 to 3.5 moles of formaldehyde. The preferred mole ratio of these reactants is, however, 1 mole of benzoguanamine to 3 moles of formaldehyde.

Add 977 parts of recrystallized melamine and continue to heat at 200° F. After 5 to 10 minutes at this temperature, cool the syrup toward 145–150° F. and transfer one half of batch to each of two holding tanks. At this point the mol ratio of melamine to benzoguanamine in the syrup is 1:1.5 respectively. This means that enough of the benzoguanamine component has been able to be added to insure stain resistance in the final resinous molded product. The ratio of total triazines to formaldehyde is about 1:1.8 respectively at this point.

At this point from 0.1 to about 0.6 percent of the latent catalyst $MgBr_2 \cdot 6H_2O$ is introduced into the syrupy mixture so as to be available at a later date for use as a curing catalyst. In this selected embodiment 2.5 parts of the magnesium bromide curing catalyst was added to the aqueous syrup in each holding tank while cooling.

Charge to a suitable mixer, for example, 3015 parts of syrup and 929 parts of α-cellulose pulp and mix for about 15 minutes at 140–145° F.

The impregnated pulp is then dried on a continuously moving screen dryer bed at a temperature of about 220° F. down to a moisture content of less than 10 percent. This also serves to advance the degree of reaction to an intermediate state of condensation.

The material from this stage is what is known as "popcorn" and is now introduced into a ball mill as described in the specification above. It is milled for about 4 hours while a second curing catalyst, about 0.1 to 0.5 percent of phthalic anhydride, is added while other substances such as lubricants, pigments and the like are also added.

The rest of the processing is conventional densification to produce a product having an apparent density of about 0.6 in the final molding powder.

Other variations in my new method may become obvious to those versed in the art after reading my detailed description of the invention described and claimed herein.

What is claimed is:
1. A process for the manufacture of benzoguanamine-melamine-formaldehyde resinous composition which comprises:
 (a) first reacting the benzoguanamine and formaldehyde to form a water-soluble monomeric reaction product which is a mixture of dimethylol and trimethylol benzoguanamine wherein the mole ratio of benzoguanamine to formaldehyde is between 1:3.45 and 1:2.62, respectively and the pH of the reaction is maintained at about 9.0,
 (b) adding melamine to the monomeric methylolbenzoguanamine formed in the preceding step to cause the melamine to react substantially mole for mole with the balance of the formaldehyde and to exhaust the melamine reactant in the solution, and
 (c) adding from about 0.1% to 0.6% by weight of a latent magnesium-bromide polymerization catalyst thereto to form a hydrophilic syrup reaction product therefrom wherein the mole ratio of melamine to benzoguanamine is between about 1:2 and 3:1, respectively and the mole ratio of melamine and benzoguanamine to formaldehyde is between about 1:1.5 and 1:2.1, respectively.
2. A process for the manufacture of a benzoguanamine-melamine-formaldehyde molding composition containing the resinous composition prepared by the process of claim 1 which comprises adding to the hydrophilic syrup reaction product of claim 1 a fibrous filler, drying, comminuting, densifying and granulating to obtain an improved molding composition.
3. A process according to claim 1 wherein the mole ratio of the benzoguanamine to formaldehyde in step (a) is maintained at 1:3 respectively in the initial reactor.
4. A process according to claim 3 wherein the mole ratio of melamine to benzoguanamine in the hydrophilic syrup is maintained at 1:1.5 respectively.
5. A process according to claim 4 wherein the mole ratio of the melamine and benzoguanamine to formaldehyde is maintained at 1:1.8 respectively.

References Cited

UNITED STATES PATENTS

| | | | |
|---|---|---|---|
| Re. 24,351 | 8/1957 | Varela et al. | 18—60 |
| 2,579,985 | 12/1951 | Varela et al. | 260—67.6 |
| 3,082,190 | 3/1963 | Boldizar | 260—67.6 |
| 3,367,917 | 2/1968 | Granito | 260—67.6 |

WILLIAM H. SHORT, *Primary Examiner.*

HOWARD SCHAIN, *Assistant Examiner.*

U.S. Cl. X.R.

260—17.3, 39; 264—319, 331